(12) United States Patent
Stark et al.

(10) Patent No.: US 7,381,761 B2
(45) Date of Patent: Jun. 3, 2008

(54) METHOD FOR PRODUCING SILICONE-TREATED POLYMERS

(75) Inventors: Kurt Stark, Weilersbach (DE); Christian Högl, Reut (DE)

(73) Assignee: Wacker Chemie A.G., Munich (DE)

( * ) Notice: Subject to any disclaimer, the term of this patent is extended or adjusted under 35 U.S.C. 154(b) by 225 days.

(21) Appl. No.: 10/542,790

(22) PCT Filed: Dec. 18, 2003

(86) PCT No.: PCT/EP03/14491

§ 371 (c)(1),
(2), (4) Date: Jul. 19, 2005

(87) PCT Pub. No.: WO2004/065437

PCT Pub. Date: Aug. 5, 2004

(65) Prior Publication Data

US 2006/0074187 A1    Apr. 6, 2006

(30) Foreign Application Priority Data

Jan. 20, 2003  (DE)  ................. 103 01 975

(51) Int. Cl.
*C08J 3/12*     (2006.01)
*C08F 6/12*     (2006.01)

(52) U.S. Cl. ............ 523/340; 524/266; 524/268; 524/804; 524/832; 524/834; 524/836; 525/100; 528/502 E; 526/319; 526/328; 526/329; 526/329.2

(58) Field of Classification Search ............ None
See application file for complete search history.

(56) References Cited

U.S. PATENT DOCUMENTS

| 5,216,070 A | 6/1993 | Plochocka et al. |
| 6,339,041 B1 * | 1/2002 | Aono ............... 503/226 |
| 2003/0114583 A1 | 6/2003 | Stark et al. |

FOREIGN PATENT DOCUMENTS

| CA | 2 480 840 | 10/2003 |
| DE | 25 55 568 | 6/1976 |
| DE | 42 40 108 A1 | 6/1994 |
| DE | 199 51 877 A1 | 5/2001 |
| DE | 100 41 163 A1 | 3/2002 |
| DE | 102 15 962 A1 | 10/2003 |
| EP | 0 614 924 A1 | 9/1994 |
| EP | 1 308 468 A1 | 5/2003 |
| JP | 49-106582 | 10/1974 |
| JP | 59-184208 | 10/1984 |
| JP | 60-231704 | 11/1985 |
| JP | 63-122015 A | 5/1988 |
| JP | 02-173106 A | 7/1990 |
| JP | 04-130137 | 5/1992 |
| JP | 10-337965 | * 12/1998 |
| WO | WO 99/04750 | 2/1999 |

OTHER PUBLICATIONS

Derwent Abstract corresponding to DE 100 44 163 A1.
Derwent Abstract corresponding to DE 42 40 108 A1.
Patent Abstract corresponding to JP 04-130137.
Patent Abstract corresponding to JP 63-122015.
Patent Abstract corresponding to JP 2-173106.
Derwent Abstract corresponding to JP 60-231704.
Derwent Abstract corresponding to JP 59-184208.
Derwent Abstract corresponding to JP 49-106582.
Derwent Abstract corresponding to DE 25 55 568 A1.
CA 2 480 840 A1 corresponds to DE 102 15 962 A1.
Derwent Abstract corresponding to DE 199 51 877 A1.
Fox, T.G., Bull. Am. Phys. Soc. 1, 1956, p. 123.
Lee et al., "The Glass Transition Temperatures of Polymers," Polymer Handbook, 2nd Ed., J. Wiley & sons, NY, 1975.
Abstract of Kawakamie et al., "Synthesis of a Well-Defined Graft Copolymer with Oligodimethylsiloxan and Polyvinylalcoholl Ramifications," Polym. Bull., vol. 18, No. 6, Berlin, 1987, pp. 473-477.
Abstract of Tazuka et al., Synthesis of a Polyvinylalcoholpolydimethylsiloxan-block Copolymers, Makromol. Chem., Rapid Commun., vol. 5, No. 9, 1984, pp. 559-565.

* cited by examiner

*Primary Examiner*—Marc S. Zimmer
(74) *Attorney, Agent, or Firm*—Brooks Kushman P.C.

(57) ABSTRACT

Silicone-containing addition polymers having numerous uses are prepared by polymerizing addition polymerizable monomers in the presence of a silicone-containing polyvinyl alcohol, and/or by adding a silicone-containing polyvinyl alcohol to an aqueous addition polymer dispersion prior to spray drying, the silicone-containing polyvinyl alcohol containing at least one polymerizable group.

11 Claims, No Drawings

METHOD FOR PRODUCING SILICONE-TREATED POLYMERS

CROSS-REFERENCE TO RELATED APPLICATION

This application claims priority to PCT Appln. No. PCT/EP2003/14491 filed Dec. 18, 2003, and to German application 103 01 975.8 filed Jan. 20, 2003.

BACKGROUND OF THE INVENTION

1. Field of the Invention

The invention relates to a process for preparing silicone-modified polymers in the form of their aqueous polymer dispersions or in the form of their polymer powders, to their use, and to protective colloids comprising silicone units.

2. Description of the Related Art

Organosilicon compounds such as organosiloxane polymers are used for hydrophobicizing polymers of ethylenically unsaturated monomers. Such hydrophobically modified polymers are used in many fields in the form of their polymer powders, in particular water-redispersible polymer powders, or as aqueous polymer dispersions. They are employed as binders in coating compositions or adhesives, in particular in the building sector and textile sector, and also as binders in cosmetics and haircare products.

It is known from WO-A 95/20626 that water-redispersible polymer powders can be modified by addition of noncopolymerizable organosilicon compounds. EP-A 0352339 describes protective surface coatings for concrete constructions, which comprise copolymers of divinylpolydimethylsiloxane with acrylate esters or methacrylate esters and with vinyl- or acryl-functional alkoxysilanes as a solution in organic solvent. EP-B 771826 describes aqueous binders for coatings and adhesives which are based on emulsion polymers of vinyl esters, acrylic or methacrylic esters or vinyl aromatics containing polysiloxanes having unsaturated radicals, for example vinyl, acryloxy or methacryloxy groups, as crosslinkers. EP-A 943634 describes aqueous latices for use as coating compositions, which are prepared by copolymerization of ethylenically unsaturated monomers in the presence of a silicone resin containing silanol groups. EP-A 1095953 describes silicone-grafted vinyl copolymers in which a carbosiloxane dendrimer is grafted onto the vinyl polymer.

It is known from DE-A 19951877 and WO-A 99/04750 that silicone-containing polymers are obtainable by polymerization of ethylenically unsaturated monomers in the presence of a linear polydialkylsiloxane having polyalkylene oxide side chains. US-A 5216070 describes a process for the inverse emulsion polymerization of carboxyl-functional monomers, in which linear polydialkylsiloxanes having polyalkylene oxide side chains are used as an emulsifier. DE-A 4240108 describes a polymerization process for preparing polysiloxane-containing binders for use in dirt-repellent coatings, in which the monomers are polymerized in the presence of an OH—, COOH— or epoxy-functional polydialkylsiloxane which may additionally contain polyether groups. DE-A 10041163 discloses a process for producing hair-cosmetic formulations, in which vinyl esters are polymerized in the presence of a polyether-containing compound, for example polyether-containing silicone compounds.

A disadvantage of the silicone-modified emulsion polymers described in the prior art is a strong tendency to hydrolyze and to undergo uncontrolled crosslinking, which in some applications may indeed be desirable and is subsequently reinforced by addition of silane and catalyst, but in the case of surface coating dispersions or when the emulsion polymers are used as coating compositions leads to undesirable gel particles, "specks" and insoluble constituents. Furthermore, the silicone-containing emulsion polymers known hitherto are often not alkali-resistant, since silicones are known to be unstable in an alkaline medium. For this reason, the hydrophobicity and the associated positive properties of the systems described hitherto decrease greatly after a prolonged period of time. Finally, the introduction of a large amount of silanes or silicones into the emulsion polymers results in establishment of an unsatisfactory particle size distribution, i.e. the particles become too large and the polymer becomes inhomogeneous, which can lead to serum formation or phase separation. Furthermore, coagulum formation can also occur.

SUMMARY OF THE INVENTION

It was an object of the invention to develop polymers which are hydrolysis-resistant and hydrophobic and therefore weathering-stable, water-repellent and nonsoiling and also have a good water vapor permeability and a high wet abrasion resistance. A further object was to provide a process by means of which hydrophobically modified polymers having a narrow particle size distribution and no coagulation can be obtained. These and other objects are achieved by polymerization of one or more unsaturated monomers in the presence of a silicone-containing polyvinyl alcohol copolymer of defined composition.

DETAILED DESCRIPTION OF THE PREFERRED EMBODIMENT(S)

The invention provides a process for preparing silicone-modified polymers in the form of their aqueous polymer dispersions or in the form of their polymer powders by means of free-radical polymerization of ethylenically unsaturated monomers in an aqueous medium and, if appropriate, drying of the polymer dispersions obtainable in this way, characterized in that one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinyl aromatics, olefins, dienes and vinyl halides are polymerized, with a silicone-containing vinyl alcohol copolymer comprising a) from 0 to 60% by weight of one or more monomer units of vinyl esters of unbranched or branched alkylcarboxylic acids having from 1 to 15 carbon atoms,
b) from 20 to 99.5% by weight of vinyl alcohol units,
c) from 0.5 to 70% by weight of monomer units of one or more silicones having the general formula $R^1_a R_{3-a} SiO(SiR_2O)_n SiR_{3-a} R^1_a$, where the radicals R are identical or different and are each a monovalent, substituted or unsubstituted alkyl radical or alkoxy radical having in each case from 1 to 18 carbon atoms, $R^1$ is a polymerizable group, a is 0 or 1 and n is from 10 to 1000, and also, if desired, further auxiliary monomers, where at least one silicone contains at least one radical $R^1$ and the percentages by weight add up to 100% by weight, being added before, during or after their polymerization.

Suitable vinyl esters are vinyl esters of unbranched or branched carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 5 to 13 carbon atoms, for example VeoVa9$^R$ or VeoVa10$^R$ (trade names of Shell). Particular preference is given to vinyl acetate and the greatest preference is given to a combination of vinyl acetate with α-branched monocarboxylic acids having from 5 to 11 carbon atoms, e.g. VeoVa10.

Suitable monomers from the group of esters of acrylic acid or methacrylic acid are esters of unbranched or branched alcohols having from 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl, isobutyl and t-butyl acrylate, n-butyl, isobutyl and t-butyl methacrylate, 2-ethylhexyl acrylate, norbornyl acrylate.

Particular preference is given to methyl acrylate, methyl methacrylate, n-butyl, isobutyl and t-butyl acrylate, 2-ethylliexyl acrylate and norbornyl acrylate.

Suitable dienes are 1,3-butadiene and isoprene. Examples of copolymerizable olefins are ethene and propene. Vinylaromatics which can be copolymerized are styrene and vinyltoluene. From the group of vinyl halides, use is usually made of vinyl chloride, vinylidene chloride or vinyl fluoride, preferably vinyl chloride.

If desired, from 0.05 to 30% by weight, based on the total weight of the ethylenically unsaturated monomers, of auxiliary monomers can be copolymerized. Examples of auxiliary monomers are ethylenically unsaturated monocarboxylic and dicarboxylic acids or salts thereof, preferably crotonic acid, acrylic acid, methacrylic acid, fumaric acid and maleic acid; ethylenically unsaturated carboxamides and carboxylic nitriles, preferably acrylamide and acrylonitrile; monoesters and diesters of fumaric acid and maleic acid, e.g. the diethyl and diisopropyl esters, and also maleic anhydride, ethylenically unsaturated sulfonic acids or salts thereof, preferably vinylsulfonic acid, 2-acrylamido-2-methylpropanesulfonic acid. Further suitable auxiliary monomers are cationic monomers such as diallyldimethylammonium chloride (DADMAC), 3-trimethylammoniopropyl (meth)acrylamide chloride (MAPTAC) and 2-trimethylammonioethyl (meth)acrylate chloride. Also suitable are vinyl ethers, vinyl ketones, further vinylaromatic compounds which may also contain heteroatoms.

Suitable auxiliary monomers also include polymerizable silanes or mercaptosilanes. Preference is given to γ-acryl- or γ-methacryloxypropyltri(alkoxy)silanes, α-methacryloxymethyltri(alkoxy)silanes, γ-methacryloxy-propylmethyldi(alkoxy)silanes, vinylalkyldi(alkoxy)silanes and vinyltri(alkoxy)silanes, with, for example, methoxy, ethoxy, methoxyethylene, ethoxyethylene, methoxypropylene glycol ether or ethoxypropylene glycol ether radicals being able to be used as alkoxy groups. Examples are vinyltrimethoxysilane, vinyltriethoxysilane, vinyltripropoxysilane, vinyltriisopropoxysilane, vinyltris(1-methoxy)isopropoxysilane, vinyltributoxysilane, vinyltriacetoxysilane, 3-methylacryloxypropyltrimethoxysilane, 3-methacryloxypropylmethyldimethoxysilane, methacryloxymethyltrimethoxysilane, 3-methacryloxypropyltris(2-methoxyethoxy)silane, vinyltrichlorosilane, vinylmethyldichlorosilane, vinyltris(2-methoxyethoxy)silane, trisacetoxyvinylsilane, 3-(triethoxysilyl)propyl(succinic anhydride)silane. Preference is also given to 3-mercaptopropyltriethoxysilane, 3-mercaptopropyltrimethoxysilane and 3-mercaptopropylmethyldimethoxysilane.

Further examples are functionalized (meth)acrylates, in particular epoxy-functional (meth)acrylates such as glycidyl acrylate, glycidyl methacrylate, allyl glycidyl ether, vinyl glycidyl ether, or hydroxyalkylfunctional (meth)acrylates such as hydroxyethyl (meth)acrylate, or substituted or unsubstituted aminoalkyl (meth)acrylates, or cyclic monomers such as N-vinylpyrrolidone.

Also suitable are polymerizable silicone macromers having at least one unsaturated group, e.g. linear or branched polydialkylsiloxanes which have a $C_1$-$C_6$-alkyl radical and a chain length of from 10 to 1000, preferably from 50 to 500, $SiO(C_nH_{2n+1})_2$ units and contain one or two terminal polymerizable groups (functional groups) or one or more polymerizable groups in the chain. Examples are polydialkylsiloxanes having one or two vinyl, acryloxyalkyl, methacryloxyalkyl or mercaptoalkyl groups, where the alkyl groups can be identical or different and contain from 1 to 6 carbon atoms. Preference is given to α,ω-divinylpolydimethylsiloxanes, α,ω-di(3-acryloxypropyl)polydimethylsiloxanes, α,ω-di(3-methacryloxypropyl)polydimethylsiloxanes, α-monovinylpolydimethylsiloxanes, 1-mono(3-acryloxypropyl)polydimethylsiloxanes, α-mono(3-methacryloxypropyl)polydimethylsiloxanes and also silicones having chain-transferring groups such as α-mono(3-mercaptopropyl)polydimethylsiloxanes or α,ω-di(3-mercaptopropyl)polydimethylsiloxanes. The polymerizable silicone macromonomers described in EP-A 614924 are also suitable.

Further examples are precrosslinking comonomers such as multiple ethylenically unsaturated comonomers, for example divinyl adipate, divinylbenzene, diallyl maleate, allyl methacrylate, butanediol diacrylate or triallyl cyanurate, or postcrosslinking comonomers, for example acrylamidoglycolic acid (AGA), methyl methylacrylamidoglycolate (MAGME), N-methylolacrylamide (NMA), N-methylolmethacrylamide, allyl N-methylolcarbamate, alkyl ethers such as the isobutoxy ether or ester of N-methylolacrylamide, of N-methylolmethacrylamide and of allyl N-methylolcarbamate.

The ethylenically unsaturated monomers are preferably selected so that aqueous copolymer dispersions and aqueous redispersions of copolymer powders which without addition of film forming aids have a minimum film formation temperature MFT of <10° C., preferably <5° C., in particular from 0° C. to 2° C., are obtained. A person skilled in the art will know on the basis of the glass transition temperature $T_g$ which monomers or monomer mixtures can be used for this purpose. The glass transition temperature $T_g$ of the polymers can be determined in a known manner by means of differential scanning calorimetry (DSC). The $T_g$ can also be calculated beforehand to a good approximation by means of the Fox equation. According to Fox T. G., Bull. Am. Physics Soc. 1, 3, page 123 (1956): $1/T_g = x1/T_g1 + x2/T_g2 + \ldots + xn/T_gn$, where xn is the mass fraction (% by weight/100) of the monomer n and $T_gn$ is the glass transition temperature in kelvin of the homopolymer of the monomer n. $T_g$ values of homopolymers are given in the Polymer Handbook 2$^{nd}$ Edition, J. Wiley & Sons, New York (1975).

Preference is given to the copolymer compositions listed below:

polymers of vinyl acetate;

vinyl ester copolymers of vinyl acetate with further vinyl esters such as vinyl laurate, vinyl pivalate, vinyl-2-ethylhexanoate, vinyl esters of an alpha-branched carboxylic acid, in particular vinyl esters of Versatic acid (VeoVa9$^R$, VeoVa10$^R$);

vinyl ester-ethylene copolymers such as vinyl acetate-ethylene copolymers which may further comprise other vinyl esters such as vinyl laurate, vinyl pivalate, vinyl 2-ethylhexanoate, vinyl esters of an alpha-branched carboxylic acid, in particular vinyl esters of Versatic acid (VeoVa9$^R$, VeoVa10$^R$), or diesters of fumaric acid or maleic acid;

vinyl ester-ethylene copolymers such as vinyl acetate-ethylene copolymers which may further comprise vinyl esters such as vinyl laurate, vinyl pivalate, vinyl 2-ethylhexanoate, vinyl esters of an alpha-branched carboxylic acid, in particular vinyl esters of Versatic acid (VeoVa9$^R$, VeoVa10$^R$) and a polymerizable silicone macromer;

vinyl ester-ethylene-vinyl chloride copolymers, with preference being given to vinyl acetate and/or vinyl propionate and/or one or more copolymerizable vinyl esters such as vinyl laurate, vinyl pivalate, vinyl 2-ethyl hexanoate, vinyl esters of an alpha-branched carboxylic acid, in particular vinyl esters of Versatic acid (VeoVa9$^R$, VeoVa10$^R$), being present as vinyl esters;

vinyl ester-acrylic ester copolymers with vinyl acetate and/or vinyl laurate and/or vinyl esters of Versatic acid and acrylic esters, in particular butyl acrylate or 2-ethylhexyl acrylate, which may further comprise ethylene;

acrylic ester copolymers, preferably with n-butyl acrylate and/or 2-ethylhexyl acrylate;

methyl methacrylate copolymers, preferably with butyl acrylate and/or 2-ethylhexyl acrylate, and/or 1,3-butadiene;

styrene-1,3-butadiene copolymers and styrene-(meth)acrylic ester copolymers such as styrene-butyl acrylate, styrene-methyl methacrylate-butyl acrylate or styrene-2-ethylhexyl acrylate, with n-butyl, isobutyl, tert-butyl acrylate being able to be used as butyl acrylate.

The greatest preference is given to vinyl ester-ethylene copolymers such as vinyl acetate-ethylene copolymers and copolymers of vinyl acetate and ethylene and vinyl esters of a α-branched carboxylic acid having 9 or 10 carbon atoms (VeoVa9$^R$, VeoVa10$^R$), and in particular copolymers of vinyl acetate, ethylene, vinyl esters of an α-branched carboxylic acid having 9 or 10 carbon atoms (VeoVa9$^R$, VeoVa10$^R$) with copolymerizable silicone macromers; having an ethylene content of preferably from 2 to 30% by weight, which may further comprise additional auxiliary monomers in the amounts indicated.

The silicone-containing polymers are prepared by means of free-radical polymerization in an aqueous medium, preferably emulsion polymerization. The polymerization is usually carried out in a temperature range from 20° C. to 100° C., in particular from 45° C. to 80° C. Initiation is effected by means of the customary free-radical initiators, which are preferably used in amounts of from 0.01 to 3.0% by weight, based on the total weight of the monomers. Initiators used are preferably inorganic peroxides such as ammonium, sodium, potassium peroxodisulfate or hydrogen peroxide, either alone or in combination with reducing agents such as sodium sulfite, sodium hydrogen sulfite, sodium formaldehydesulfoxylate or ascorbic acid. It is also possible to use water-soluble organic peroxides, for example t-butyl hydroperoxide, cumene hydroperoxide, usually in combination with reducing agents, or else water-soluble azo compounds. In the copolymerization using gaseous monomers such as ethylene and vinyl chloride, the polymerization is carried out under pressure, generally at from 1 to 100 bar$_{abs}$.

The silicone part is introduced into the polymers by adding a silicone-containing vinyl alcohol copolymer comprising a) from 0 to 60% by weight of one or more monomer units of vinyl esters of unbranched or branched alkylcarboxylic acids having from 1 to 15 carbon atoms, b) from 20 to 99.5% by weight of vinyl alcohol units, c) from 0.5 to 70% by weight of monomer units of one or more silicones having the general formula $R^1{}_aR_{3-a}SiO(SiR_2O)_nSiR_{3-a}R^1{}_a$, where the radicals R are identical or different and are each a monovalent, substituted or unsubstituted alkyl radical or alkoxy radical having in each case from 1 to 18 carbon atoms, $R^1$ is a polymerizable group, a is 0 or 1 and n is from 10 to 1000, and also, if desired, further auxiliary monomers, where at least one silicone contains at least one radical $R^1$ and the percentages by weight add up to 100% by weight, as protective colloid before, during or after the polymerization.

The proportion of vinyl ester is preferably from 3 to 35% by weight. For the proportion of vinyl alcohol, the range from 40 to 90% by weight is preferred. The proportion of silicone units is preferably from 5 to 60% by weight, in particular from 9 to 50% by weight. n is preferably from 20 to 500, particularly preferably from 40 to 200.

A preferred vinyl ester a) for preparing the silicone-containing vinyl alcohol copolymer is vinyl acetate.

Examples of radicals R in the general formula $R^1{}_aR_{3-a}SiO(SiR_2O)_nSiR_{3-a}R^1{}_a$ are the methyl, ethyl, n-propyl, isopropyl, 1-n-butyl, 2-n-butyl, isobutyl, tert-butyl, n-pentyl, isopentyl, neopentyl, tert-pentyl radical, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as n-decyl radical, dodecyl radicals such as the n-dodecyl radical and octadecyl radicals such as the n-octadecyl radical, cycloalkyl radicals such as cyclopentyl, cyclohexyl, cycloheptyl and methylcyclohexyl radicals. The radical R is preferably a monovalent hydrocarbon radical having from 1 to 6 carbon atoms, e.g. a methyl, ethyl, n-propyl, isopropyl, n-butyl, sec-butyl, amyl or hexyl radical, with particular preference being given to the methyl radical.

Preferred alkoxy radicals R are ones having from 1 to 6 carbon atoms, e.g. the methoxy, ethoxy, propoxy and n-butoxy radical, which may be further substituted by oxyalkylene radicals such as oxyethylene or oxymethylene radicals. Particular preference is given to the methoxy and ethoxy radicals. The alkyl radicals and alkoxy radicals mentioned for R may also be substituted, for example by halogen, mercapto groups, epoxy-functional groups, carboxyl groups, keto groups enamine groups, amino groups, aminoethylamino groups, isocyanato groups, aryloxy groups, alkoxysilyl groups and hydroxyl groups.

Suitable polymerizable groups $R^1$ are alkenyl radicals having from 2 to 8 carbon atoms. Examples of such polymerizable groups are the vinyl, allyl, butenyl and also acryloxyalkyl and methacryloxyalkyl groups, with the alkyl radicals having from 1 to 4 carbon atoms. Preference is given to the vinyl group, the 3-methacryloxypropyl group, the acryloxymethyl group and the 3-acryloxypropyl group.

Preference is given to α,ω-divinylpolydimethylsiloxanes, α,ω-di(3-acryloxypropyl)polydimethylsiloxanes, α,ω-di(3-methacryloxypropyl)polydimethylsiloxanes. In the case of the silicones substituted by only one unsaturated group, preference is given to α-monovinylpolydimethylsiloxanes, α-mono(3-acryloxypropyl)polydimethylsiloxanes, α-mono(acryloxymethyl)polydimethylsiloxanes, α-mono(3-methacryloxypropyl)polydimethylsiloxanes. In the monofunctional polydimethylsiloxanes, an alkyl or alkoxy radical, for example a methyl or butyl radical, is located at the other end of the chain.

Preference is also given to mixtures of linear or branched divinylpolydimethylsiloxanes with linear or branched monovinylpolydimethylsiloxanes and/or unfunctionalized polydimethylsiloxanes (the latter have no polymerizable group), and also mixtures of linear or branched monovinylpolydimethylsiloxanes with unfunctionalized polydimethylsiloxanes. The vinyl groups are preferably located at the end of the chain. Examples of such mixtures are silicones of the solvent-free Dehesive®-6 series (branched) or Dehesive®-9 series (unbranched) of Wacker-Chemie GmbH. In the binary or ternary mixtures, the proportion of unfunctional polydialkylsiloxanes is up to 15% by weight, preferably up to 5% by weight; the proportion of monofunctional polydialkylsiloxanes is up to 50% by weight; and the proportion of bifunctional polydialkylsiloxanes is at least 50% by weight, preferably at least 60% by weight, in each case based on the total weight of the silicone component.

Most preferred silicone units are $\alpha,\omega$-divinylpolydimethylsiloxanes and binary mixtures of $\alpha,\omega$-divinylpolydimethylsiloxanes with $\alpha$-monovinylpolydimethylsiloxanes and ternary mixtures of $\alpha,\omega$-divinylpolydimethylsiloxanes and $\alpha$-monovinylpolydimethylsiloxanes with unfunctionalized polydimethylsiloxane.

Apart from these monomers, further auxiliary monomers can be additionally copolymerized in the silicone-containing vinyl alcohol copolymer. Suitable auxiliary monomers are those which have been mentioned above for the polymers of ethylenically unsaturated monomers, in the amounts specified there.

Greatest preference is given to silicone-containing vinyl alcohol copolymers comprising vinyl acetate, vinyl alcohol and polydimethylsiloxane units. In general, the silicone-containing copolymers are introduced in an amount of from 0.01 to 40% by weight, preferably from 0.1 to 10% by weight, before, during or after the polymerization.

The preparation of the silicone-containing vinyl alcohol copolymers is described in DE 10215962. It is carried out by polymerization of the vinyl esters indicated and the silicone units in a nonaqueous, organic solvent, and subsequent hydrolysis of the resulting copolymers in alcoholic solution to introduce the vinyl alcohol units.

If the silicone-containing vinyl alcohol copolymer just described is introduced as protective colloid before or during the polymerization, anionic and nonionic emulsifiers and also further protective colloids can be used in addition to the silicone-containing vinyl alcohol copolymer for stabilizing the polymers. Preference is given to using nonionic or anionic emulsifiers, preferably a mixture of nonionic and anionic emulsifiers. As nonionic emulsifiers, preference is given to using condensation products of ethylene oxide or propylene oxide with linear or branched alcohols having from 8 to 18 carbon atoms, alkylphenols or linear or branched carboxylic acids having from 8 to 18 carbon atoms, and also block copolymers of ethylene oxide and propylene oxide. Suitable anionic emulsifiers are, for example, alkylsulfates, alkylsulfonates, alkylarylsulfates and also sulfates or phosphates of condensation products of ethylene oxide with linear or branched alkyl alcohols which have from 5 to 25 EO units, alkylphenols and monoesters or diesters of sulfosuccinic acid. The amount of emulsifiers is from 0.01 to 10% by weight, based on the total weight of the monomers used.

If appropriate, further protective colloids can be used in addition to the silicone-containing vinyl alcohol copolymer. Examples of suitable protective colloids are polyvinyl alcohols having a content of from 75 to 95 mol %, preferably from 84 to 92 mol %, of vinyl alcohol units; poly-N-vinyl amides such as polyvinylpyrrolidones; polysaccharides such as starches and also celluloses and their carboxymethyl, methyl, hydroxyethyl, hydroxypropyl derivatives; synthetic polymers such as poly(meth)acrylic acid, poly(meth)acrylamide. Particular preference is given to using the polyvinyl alcohols mentioned. The protective colloids are generally used in an amount of from 0.01 to 40% by weight, based on the total weight of the monomers used.

If appropriate, the molecular weight can be controlled by means of the customary regulators, for example alcohols such as isopropanol, aldehydes such as acetaldehyde, chlorine-containing compounds, mercaptans such as n-dodecyl mercaptan, t-dodecyl mercaptan, mercaptopropionic acid (esters). To set the pH, pH-regulating compounds such as sodium acetate or formic acid can be used in the preparation of the dispersion.

Regardless of the polymerization process, the polymerization can be carried out with or without use of seed lattices, with all or some constituents of the reaction mixture being initially charged, or some can be initially charged and one or more constituents of the reaction mixture can be metered in subsequently, or the polymerization can be carried out by the feed stream process without an initial charge. The comonomers and, if appropriate, the auxiliary monomers can all be initially charged in the preparation of the dispersion (batch process), or part of the monomers is initially charged and the remainder is metered in (semibatch process).

The silicone-containing vinyl alcohol copolymers can be initially charged or metered in to prepare the dispersion, or part is initially charged and the remainder is metered in. The surface-active substances can be metered in alone or as a preemulsion with the comonomers.

In the copolymerization of gaseous monomers a), e.g. ethylene, the desired amount is introduced by setting a particular pressure. The pressure under which the gaseous monomer is introduced can be set to a particular value at the beginning and can decrease during the polymerization, or the pressure is kept constant during the entire polymerization. The latter embodiment is preferred.

After conclusion of the polymerization, an after-polymerization can be carried out by known methods to remove residual monomers, for example by means of an after-polymerization initiated by a redox catalyst. Volatile residual monomers and further volatile, nonaqueous constituents of the dispersion can also be removed by means of distillation, preferably under reduced pressure, and, if appropriate with inert entrainer gases such as air, nitrogen or steam being passed through or over the reaction mixture.

The aqueous dispersions obtainable by the process of the invention have a solids content of from 30 to 70% by weight, preferably from 45 to 65% by weight. To prepare polymer powders, in particular water-redispersible polymer powders, the aqueous dispersions, if appropriate after addition of protective colloids as atomization aid, are dried, for example by means of fluidized bed drying, freeze drying or spray drying. The dispersions are preferably spray dried. Spray drying is carried out in conventional spray drying units, with atomization being able to be carried out by means of single-fluid, two-fluid or multifluid nozzles or using a rotating disc. The outlet temperature is generally in the range from 45° C. to 120° C., preferably from 60° C. to 90° C., depending on the unit, the $T_g$ of the resin and the desired degree of drying.

In general, the atomization aid is used in a total amount of from 3 to 30% by weight, based on the polymeric constituents of the dispersion. Suitable atomization aids are the abovementioned protective colloids. Particular preference is also given to using the silicone-containing vinyl alcohol copolymers as atomization aid.

A content of up to 1.5% by weight of antifoams, based on the base polymer, has frequently been found to be advantageous for atomization. To improve the blocking stability, the powder obtained can be mixed with an antiblocking agent (anticaking agent), preferably in an amount of up to 30% by weight, based on the total weight of polymeric constituents. Examples of antiblocking agents are Ca or Mg carbonate, talc, gypsum, silica, kaolins, silicates.

Emulsion polymers which are hydrophobic, stable to weathering, water-repellent, very stable and soiling-resistant and also have a good water vapor permeability are obtained.

The silicone-containing polymers in the form of their aqueous dispersions and in the form of their polymer powders, in particular water-redispersible polymer powders, are suitable for use in adhesives or coating compositions, for strengthening fibers or other particulate materials, for example for the textile sector. They are also suitable as modifiers and hydrophobicizing agents. They can also be used advantageously in the field of polishers and in cosmetics, e.g. in the haircare field. They are also suitable as binders in adhesives and coating compositions, and also as protective coating, e.g. for metals, films, wood, or as release coating, e.g. for paper treatment. They are particularly useful as binders for paints, adhesives and coating compositions in the building sector, for example in tile adhesives and thermal insulation adhesives, and in particular for use in low-emission plastic emulsion paints and plastic emulsion renders, both for interior and exterior use. The formulations for emulsion paints and emulsion renders are known to those skilled in the art, and generally comprise from 5 to 50% by weight of the silicone-containing polymers, from 5 to 35% by weight of water, from 5 to 80% by weight of filler, from 5 to 30% by weight of pigments and from 0.1 to 10% by weight of further additives, with the percentages by weight in the formulation adding up to 100% by weight.

Examples of fillers which can be used are carbonates such as calcium carbonate in the form of dolomite, calcite and chalk. Further examples are silicates such as magnesium silicate in the form of talc, or aluminum silicates such as clays; quartz flour, silica sand, finely divided silica, feldspar, barite and gypsum. Fibrous fillers are also suitable. Mixtures of various fillers are frequently used in practice, for example mixtures of fillers having different particle sizes or mixtures of carbonaceous and siliceous fillers. In the latter case, a formulation whose filler has a proportion of more than 50% by weight, in particular more than 75% by weight, based on the total amount of filler, of carbonate or silicate is referred to as carbonate-rich or silicate-rich, respectively. Plastic renders generally contain coarser fillers than emulsion paints. The particle size is often in the range from 0.2 to 5.0 mm. Otherwise, plastic renders can contain the same additives as emulsion paints.

Suitable pigments are, for example, titanium dioxide, zinc oxide, iron oxides, carbon black as inorganic pigments, and also the customary organic pigments. Examples of further additives are wetting agents in amounts of generally from 0.1 to 0.5% by weight, based on the total weight of the formulation. Examples of these are sodium and potassium polyphosphates, polyacrylic acids and salts thereof. Further additives which may be mentioned are thickeners which are generally used in an amount of from 0.01 to 2.0% by weight, based on the total weight of the formulation. Customary thickeners are cellulose ethers, starches and bentonites as an example of an inorganic thickener. Further additives are preservatives, antifoams, antifreezes.

To produce the adhesives and coating compositions, the polymer dispersion of the polymer powder is mixed with the further constituents of the formulation, viz. fillers and further additives, and homogenized in suitable mixers. The polymer powder can, if appropriate, also be added in the form of an aqueous redispersion on the building site. In many cases, a dry mix is prepared and the water necessary for processing is added immediately before processing. In the production of paste-like compositions, a common procedure is firstly to place the appropriate amount of water in a mixing vessel, add the dispersion and finally stir in the solids.

The silicone-containing polymers are particularly advantageous as binders in coating formulations for low-emission interior paints, in particular those having a high PVK (highly filled paints), or as hydrophobicizing binder for renders.

The following examples serve to illustrate the invention without restricting it in any way.

Preparation of the silicone-containing vinyl alcohol copolymers:

1. Preparation of vinyl acetate-polydimethylsiloxane copolymers:

EXAMPLE a 54.65 kg of ethyl acetate, 303.33 g of PDMS mixture (=Dehesive® 929), 5.47 kg of isopropanol, 44.71 g of PPV (t-butyl perpivalate, 75% strength solution in aliphatics) and 2.73 kg of vinyl acetate were placed in a 120 l stirred vessel provided with anchor stirrer, reflux condenser and metering facilities. The initial charge was subsequently heated to 75° C. at a stirrer speed of 95 rpm. After the internal temperature of 70° C. had been reached, the metered addition of initiator (4.10 kg of ethyl acetate and 173.91 g of PPV) at a rate of 826 g/h was commenced. Ten minutes after the start of the metered addition of initiator, the monomers (2.43 kg of PDMS mixture and 21.86 kg of vinyl acetate) were metered in at a rate of 6.08 kg/h. The metered addition of initiator extended over a period of 310 minutes, while the metered addition of monomers ended 60 minutes earlier. After the end of both metered additions, the polymerization was continued at 70° C. for a further 120 minutes. The polymer solution obtained was subsequently heated for distillation (solvent replacement), with the distillate being replaced every now and again by methanol. This procedure was repeated until the solution was free of ethyl acetate and isopropanol.

Analyses: solids content (SC): 45.6% (in methanol), GC analysis: residual VAc content: 20 ppm, residual ethyl acetate: 1100 ppm, acid number (AN): 3.36 mg KOH/g, viscosity (Höppler, 10% strength solution in ethyl acetate) =1.34 mPas; SEC $M_w$=13502 g/mol, $M_n$=5075 g/mol, polydispersity=2.66;

glass transition temperature ($T_g$): $T_g$=30.1° C. Composition of the resin according to $^1$H NMR (CDCl$_3$) 10.75% by weight (12.28 mol %) of PDMS, 89.25% by weight (87.72 mol %) of PVAc.

EXAMPLE b 51.57 kg of ethyl acetate, 481.63 g of PDMS mixture (Dehesive 929), 8.09 kg of isopropanol, 51.78 g of PPV (t-butyl perpivalate, 75% strength solution in aliphatics) and 2.53 kg of vinyl acetate were placed in a 120 l stirred vessel provided with anchor stirrer, reflux condenser and metering facilities. The initial charge was subsequently heated to 70°

C. at a stirrer speed of 95 rpm. After the internal temperature of 70° C. had been reached, the metered addition of initiator (4.07 kg of ethyl acetate and 201.33 g of PPV) at a rate of 827 g/h was commenced. Ten minutes after the start of the metered addition of initiator, the monomers (3.86 kg of PDMS mixture and 20.25 kg of vinyl acetate) were metered in at a rate of 6.03 kg/h. The metered addition of initiator extended over a period of 310 minutes, while the metered addition of monomers ended 60 minutes earlier. After the end of both metered additions, the polymerization was continued at 70° C. for a further 120 minutes. The polymer solution obtained was subsequently heated for distillation (solvent replacement), with the distillate being replaced every now and again by methanol. This procedure was repeated until the solution was free of ethyl acetate and isopropanol.

Analyses: SC: 50.0% (in methanol), GC analysis: residual VAc content: 420 ppm, residual ethyl acetate: 1.06%, acid number: 2.80 mg KOH/g, viscosity (Höppler, 10% strength solution in ethyl acetate)=1.39 mPas;

SEC $M_w$=13640 g/mol, $M_n$=4497 g/mol, polydispersity=3.03;

glass transition temperature ($T_g$): $T_g$=28.6° C. Composition of the resin according to $^1$H NMR (CDCl$_3$): 17.46% by weight (19.75 mol %) of PDMS, 82.54% by weight (80.25 mol %) of PVAc.

EXAMPLE c 49.97 kg of ethyl acetate, 651.01 g of PDMS mixture (Dehesive 929), 9.38 kg of isopropanol, 58.88 g of PPV (t-butyl perpivalate, 75% strength solution in aliphatics) and 2.34 kg of vinyl acetate were placed in a 120 l stirred vessel provided with anchor stirrer, reflux condenser and metering facilities. The initial charge was subsequently heated to 70° C. at a stirrer speed of 95 rpm. After the internal temperature of 70° C. had been reached, the metered addition of initiator (4.05 kg of ethyl acetate and 228.88 g of PPV) at a rate of 829 g/h was commenced. Ten minutes after the start of the metered addition of initiator, the monomers (5.21 kg of PDMS mixture and 18.77 kg of vinyl acetate) were metered in at a rate of 6.0 kg/h. The metered addition of initiator extended over a period of 310 minutes, while the metered addition of monomers ended 60 minutes earlier. After the end of both metered additions, the polymerization was continued at 70° C. for a further 120 minutes. The polymer solution obtained was subsequently heated for distillation (solvent replacement), with the distillate being replaced every now and again by methanol. This procedure was repeated until the solution was free of ethyl acetate and isopropanol.

Analyses: SC: 52.9% (in methanol), GC analysis: residual VAc content: 60 ppm, residual ethyl acetate: 2.0%, AN: 2.24 mg KOH/g, viscosity (Höppler, 10% strength solution in ethyl acetate)=1.23 mPas; SEC $M_w$=10777 g/mol, $M_n$=3626 g/mol, polydispersity=2.97;

glass transition temperature ($T_g$): $T_g$=26.2° C. Composition of the resin according to $^1$H NMR (CDCl$_3$): 22.56% by weight (25.31 mol %) of PDMS, 77.44% by weight (74.69 mol %) of PVAc.

2. Hydrolysis of the vinyl acetate-polydimethylsiloxane copolymers to produce the silicone-containing vinyl alcohol copolymers:

EXAMPLE d 17.8% by Weight of Silicone 26.3 kg of a 45.6% strength polymer solution in methanol, prepared as described in Example a), were placed in a 120 l stirred vessel (atmospheric pressure) provided with reflux condenser, metering facilities and an anchor stirrer and diluted to an SC of about 20% with methanol. This solution was then heated to 35° C. 220 ml of 45% strength aqueous/methanolic sodium hydroxide were subsequently added quickly. 11 minutes after the addition of the alkali, the mixture was set to a pH of about 7 by means of concentrated acetic acid. To obtain the precipitated polyvinyl alcohol as an aqueous solution, the suspension was heated for distillation and the distillate was gradually replaced by water. This procedure was repeated until all of the methanol had been replaced by water.

Aqueous PVA Solution—Analyses:

SC: 11.3%; AM: 0 mg KOH/g; pH (4% strength in water): 6.5; saponification number (SN): 87.15 mg KOH/g;

VOC (volatile organic compounds) (methanol): 8 ppm Composition according to $^1$H-NMR (in DMSO with trifluoroacetic acid as shift reagent): 13.9% by weight (8.2 mol %) of vinyl acetate, 68.3% by weight (79.5 mol %) of vinyl alcohol, 17.8% by weight (12.3 mol %) of PDMS.

EXAMPLE e 26.0% by Weight of Silicone

Procedure as in Example d), but a hydrolysis time of 13 minutes. The resin from Example b) was hydrolyzed.

Aqueous PVA Solution—Analyses:

SC: 11.4%; AN: 0 mg KOH/g; pH (4% strength in water) 6.74; CN: 96.33 mg KOH/g;

VOC (methanol): 590 ppm Composition according to $^1$H NMR (in DMSO with trifluoroacetic acid as shift reagent): 15.0% by weight (9.3 mol %) of vinyl acetate, 59.0% by weight (71.8 mol %) of vinyl alcohol; 26.0% by weight (18.9 mol %) of PDMS.

EXAMPLE f 31.3% by Weight of Silicone

Procedure as in Example d), but a hydrolysis time of 11 minutes. The resin from Example c) was hydrolyzed.

Aqueous PVA Solution—Analyses:

SC: 10.95%; AN: 0 mg KOH/g; pH (4% strength in water): 6.79; CN: 45.5 mg KOH/g;

VOC (methanol): not determined Composition according to $^1$H NMR (in DMSO with trifluoroacetic acid as shift reagent): 5.4% by weight (3.2 mol %) of vinyl acetate, 63.3% by weight (74.8 mol %) of vinyl alcohol; 31.3% by weight (22.0 mol %) of PDMS.

Preparation of polymer dispersions and polymer powders using the silicone-containing polyvinyl alcohols:

Raw materials:

Genapol X 150:

ethoxylated isotridecyl alcohol having a degree of ethoxylation of 15.

Mersolat:

Na alkylsulfonate having from 12 to 14 carbon atoms in the alkyl radical.

Airvol 513:

commercial polyvinyl alcohol (from Air Products & Chemicals) having a viscosity of about 14 mPas (20° C., 4% strength solution, measured by the Höppler method) and a saponification number of 140 (mg KOH/g of polymer) (degree of hydrolysis: 88 mol %).

G04/140:
commercial polyvinyl alcohol (from Clariant) having a viscosity of about 4 mPas (20° C., 4% strength solution, measured by the Höppler method) and a saponification number of 140 (mg KOH/g of polymer) (degree of hydrolysis: 88 mol %).

Polyvinyl alcohol W25/140:
polyvinyl alcohol having a viscosity of about 25 mPas (20° C., 4% strength solution, measured by the Höppler method) and a saponification number of 140 (mg KOH/g of polymer) (degree of hydrolysis: 88 mol %).

Genapol PF80:
EO-PO block polymer containing 80% of EO.

PDMS mixture (Dehesive® 929):
Mixture of three polydimethylsiloxanes having about 100 $SiMe_2$ units which comprises about 5% by weight of unfunctionalized polydimethylsiloxane, 20% by weight of α-monovinyl-functionalized polydimethylsiloxane and 75% by weight of α,ω-divinyl-functionalized polydimethylsiloxane.

COMPARATIVE EXAMPLE 1

Vinyl acetate-ethylene-vinylsilane-GMA Copolymer Stabilized with Polyvinyl Alcohol (Without Silicone-Containing Vinyl Alcohol Copolymer)

3.64 kg of water, 177.44 g of Genapol X 150 (40% strength aqueous solution), 164.52 g of Mersolat (40% strength aqueous solution), 70.97 g of sodium vinylsulfonate (25% strength) and 887.18 g of vinyl acetate were placed in a 19 l pressure autoclave. The pH was set to 5 by means of 10% strength formic acid. In addition, 9.7 ml of Trilon B (EDTA; 2% strength aqueous solution) and 30.6 ml of ammonium iron sulfate (1% strength solution) were added. The vessel was heated to 70° C. and pressurized with 22 bar of ethylene. As soon as the reactor was in thermal equilibrium, 68 g/h of a 5.4% strength ammonium peroxodisulfate solution (APS solution) and 85 g/h of a 4.16% strength sodium sulfite solution were fed in. 25 minutes later, introduction of a mixture of 6.92 kg of vinyl acetate and 45.26 g of vinyl trimethylsiloxane (Wacker Silan XL 10) at a rate of 1202 g/h (metered addition of monomer) was commenced.

At the same time, an emulsifier mixture was fed in at a rate of 331 g/h. The emulsifier mixture comprised 385.92 g of water, 931.54 g of Genapol X 150 (40% strength aqueous solution) and 501.26 g of G 04/140 (polyvinyl alcohol; 20% strength solution).

The total time over which the monomer was metered in was 5.8 h and that over which the emulsifier was metered in was 5.5 h.

15 minutes after commencement of the reaction, the rate of addition of the APS was reduced to 42.2 g/h, and the rate of addition of the Na sulfite was reduced to 52.7 g/h.

30 minutes after the end of the metered addition of emulsifier, the "GMA mixture" was fed in. Composition of the "GMA mixture": 177.44 g of vinyl acetate and 53.23 g of glycidyl methacrylate. The time of addition was 30 minutes (rate: 462 g/h). After the end of the metered addition of the "GMA mixture", the introduction of APS and Na sulfite was continued for 1 hour. After depressurization, the dispersion was treated with steam ("stripped") to minimize the amount of residual monomers, and Hydrol W was subsequently added as preservative.

Dispersion analyses: see Table 1

COMPARATIVE EXAMPLE 2

Vinyl acetate-VeoVa-ethylene-vinylsilane-GMA-PDMS Copolymer Stabilized with Polyvinyl Alcohol (without Silicone-Containing Vinyl Alcohol Copolymer)

76.80 kg of water, 27.12 kg of W 25/140 (polyvinyl alcohol; 10% strength solution), 4.80 kg of Genapol X 150 (40% strength aqueous solution), 3.44 kg of Mersolat (40% strength aqueous solution), 1.92 kg of sodium vinylsulfonate (25% strength), 18.00 kg of vinyl acetate, 4.80 kg of PDMS mixture and 18.00 kg of VeoVa 10 were placed in a 572 l pressure autoclave. The pH was set to 5 by means of 10% strength formic acid. In addition, 314 ml of Trilon B (EDTA; 2% strength aqueous solution) and 991 ml of ammonium iron sulfate (1% strength solution) were added. The vessel was heated to 70° C. and pressurized with 13 bar of ethylene. As soon as the reactor was in thermal equilibrium, 1023 g/h of a 10.0% strength ammonium peroxodisulfate solution (APS solution) and 1976 g/h of a 5.05% strength sodium sulfite solution were fed in. 25 minutes later, introduction of a mixture of 166.80 kg of vinyl acetate, 29.28 kg of VeoVa 10 and 1.22 kg of vinyl trimethoxysiloxane (Wacker Silan XL 10) at a rate of 34.02 kg/h (metered addition of monomer) was commenced.

At the same time, an emulsifier mixture was fed in at a rate of 12.89 kg/h. The emulsifier mixture comprised 45.69 g of water and 25.20 kg of Genapol X 150 (40% strength aqueous solution). The total time over which the monomer was metered in was 5.8 h and that over which the emulsifier was metered in was 5.5 h. 15 minutes after commencement of the reaction, the rate of addition of the APS was reduced to 636 g/h, and the rate of addition of the Na sulfite was reduced to 1226 g/h.

30 minutes after the end of the metered addition of emulsifier, the "GMA mixture" was fed in. Composition of the "GMA mixture": 4.80 kg of vinyl acetate, 720.01 g of VeoVa 10 and 2.88 kg of glycidyl methacrylate. The time of addition was 30 minutes (rate: 16.8 kg/h). After the end of the metered addition of the "GMA mixture", the introduction of APS and Na sulfite was continued for 1 hour. After depressurization, the dispersion was treated with steam ("stripped") to minimize the amount of residual monomers, and Hydrol W was subsequently added as preservative.

Dispersion analyses: see Table 1

COMPARATIVE EXAMPLE 3

Vinyl acetate-ethylene-vinylsilane-GMA Copolymer Stabilized with Polyvinyl Alcohol (without Silicone-Containing Vinyl Alcohol Copolymer):

102.99 kg of water, 17.90 kg of Genapol X 150 (40% strength aqueous solution), 3.54 kg of Mersolat (40% strength aqueous solution), 1.97 kg of sodium vinylsulfonate (25% strength), 13.95 kg of W 25/140 (polyvinyl alcohol, 10% strength in water) and 24.69 kg of vinyl acetate were placed in a 572 l pressure autoclave. The pH was set to 5 by means of 10% strength formic acid. In addition, 314 ml of Trilon B (EDTA; 2% strength aqueous solution) and 991 ml of ammonium iron sulfate (1% strength solution) were added. The vessel was heated to 70° C. and pressurized with 22 bar of ethylene. As soon as the reactor was in thermal equilibrium, 1023 g/h of a 10.0% strength ammonium peroxodisulfate solution (APS solution) and 1976 g/h of a 5.05% strength sodium sulfite solution were fed in. 25 minutes later, introduction of a mixture of 217.25 kg of vinyl acetate and 1.25 kg of vinyl trimethoxysiloxane (Wacker Silan XL 10) at a rate of 41.23 kg/h (metered addition of monomer) was commenced. At the same time, an emulsifier mixture was fed in at a rate of 9.85 kg/h. The emulsifier mixture comprised 22.34 kg of water, 12.96 kg of Genapol X 150 (40% strength aqueous solution) and 13.95 kg of W 25/140 (polyvinyl alcohol; 10% strength solution).

The total time over which the monomer was metered in was 5.3 h and that over which the emulsifier was metered in was 5.0 h.

15 minutes after commencement of the reaction, the rate of addition of the APS was reduced to 636 g/h, and the rate of addition of the Na sulfite was reduced to 1226 g/h.

30 minutes after the end of the metered addition of emulsifier, the "GMA mixture" was fed in. Composition of the "GMA mixture": 4.94 kg of vinyl acetate and 1.48 kg of glycidyl methacrylate. The time of addition was 30 minutes (rate: 12.84 kg/h). After the end of the metered addition of the "GMA mixture", the introduction of APS and Na sulfite was continued for 1 hour. After depressurization, the dispersion was treated with steam ("stripped") to minimize the amount of residual monomers, and Hydrol W was subsequently added as preservative.

Dispersion analyses: see Table 1

COMPARATIVE EXAMPLE 4

Vinyl acetate-ethylene-vinylsilane-GMA Copolymer Stabilized with Polyvinyl Alcohol (without Silicone-Containing Vinyl Alcohol Copolymer)

3.53 kg of water, 176.30 g of Genapol X 150 (40% strength aqueous solution), 163.47 g of Mersolat (40% strength aqueous solution), 70.52 g of sodium vinylsulfonate (25% strength) and 881.52 g of vinyl acetate were placed in a 19 liter pressure autoclave. The pH was set to 5 by means of 10% strength formic acid. In addition, 9.7 ml of Trilon B (EDTA; 2% strength aqueous solution) and 30.6 ml of ammonium iron sulfate (1% strength solution) were added. The vessel was heated to 70° C. and pressurized with 22 bar of ethylene. As soon as the reactor was in thermal equilibrium, 68 g/h of a 5.4% strength ammonium peroxodisulfate solution (APS solution) and 85 g/h of a 4.16% strength sodium sulfite solution were fed in. 25 minutes later, introduction of a mixture of 6.88 kg of vinyl acetate and 44.98 g of vinyl trimethoxysiloxane (Wacker Silan XL 10) at a rate of 1194 g/h (metered addition of monomer) was commenced.

At the same time, an emulsifier mixture was fed in at a rate of 359 g/h. The emulsifier mixture comprised 925.60 g of Genapol X 150 (40% strength aqueous solution) and 1050 g of Airvol V513 (polyvinyl alcohol; 9.5% strength solution).

The total time over which the monomer was metered in was 5.8 h and that over which the emulsifier was metered in was 5.5 h.

15 minutes after conmiencement of the reaction, the rate of addition of the APS was reduced to 4.2 g/h, and the rate of addition of the Na sulfite was reduced to 52.7 g/h.

30 minutes after the end of the metered addition of emulsifier, the "GMA mixture" was fed in. Composition of the "GMA mixture": 176.30 g of vinyl acetate and 52.89 g of glycidyl methacrylate. The time of addition was 30 minutes (rate: 459 g/h). After the end of the metered addition of the "GMA mixture", the introduction of APS and Na sulfite was continued for 1 hour. After depressurization, the dispersion was treated with steam ("stripped") to minimize the amount of residual monomers, and Hydrol W was subsequently added as preservative.

Dispersion Analyses: see Table 1

EXAMPLE 1

Procedure as in Comparative example 1. Only 100.11 g of the silicone-containing polyvinyl alcohol from Example d) were used in place of the polyvinyl alcohol G04/140.

Dispersion Analyses: see Table 1.

EXAMPLE 2

Procedure as in Comparative example 1. Only 100.16 g of the silicone-containing polyvinyl alcohol from Example e) were used in place of the polyvinyl alcohol G04/140.

Dispersion Analyses: see Table 1.

EXAMPLE 3

Vinyl acetate-ethylene-vinylsilane-GMA Copolymer Stabilized with Polyvinyl Alcohol and with a Silicone-Containing Vinyl Alcohol Copolymer as Protective Colloid 2.08 kg of water, 204.12 g of Genapol X 150 (40% strength aqueous solution), 151.41 g of Mersolat (40% strength aqueous solution), 809.32 g of silicone-containing polyvinyl alcohol from Example e) (11.4% in water), 65.32 g of sodium vinylsulfonate (25% strength) and 816.48 g of vinyl acetate were placed in a 19 l pressure autoclave. The pH was set to 5 by means of 10% strength formic acid. In addition, 9.7 ml of Trilon B (EDTA; 2% strength aqueous solution) and 30.6 ml of ammonium iron sulfate (1% strength solution) were added. The vessel was heated to 70° C. and pressurized with 22 bar of ethylene. As soon as the reactor was in thermal equilibrium, 68 g/h of a 5.4% strength ammonium peroxodisulfate solution (APS solution) and 85 g/h of a 4.16% strength sodium sulfite solution were fed in. 25 minutes later, introduction of a mixture of 7.19 kg of vinyl acetate and 41.66 g of vinyl trimethylsiloxane (Wacker Silan XL 10) at a rate of 1247 g/h (metered addition of monomer) was commenced.

At the same time, an emulsifier mixture was fed in at a rate of 464 g/h. The emulsifier mixture comprised 919.14 g of water and 1.63 kg of Genapol PF 80 (20% strength aqueous solution).

The total time over which the monomer was metered in was 5.8 h and that over which the emulsifier was metered in was 5.5 h.

15 minutes after commencement of the reaction, the rate of addition of the APS was reduced to 42.2 g/h, and the rate of addition of the Na sulfite was reduced to 52.7 g/h.

30 minutes after the end of the metered addition of emulsifier, the "GMA mixture" was fed in. Composition of the "GMA mixture": 163.3 g of vinyl acetate and 48.99 g of glycidyl methacrylate. The time of addition was 30 minutes (rate: 425 g/h). After the end of the metered addition of the "GMA mixture", the introduction of APS and Na sulfite was continued for 1 hour. After depressurization, the dispersion was treated with steam ("stripped") to minimize the amount of residual monomers, and Hydrol W was subsequently added as preservative.

Dispersion Analyses: see Table 1

EXAMPLE 4

Procedure as in Example 3. Only 92.22 g of the silicone-containing polyvinyl alcohol from Example d) were used in place of the silicone-containing polyvinyl alcohol from Example e).

Dispersion Analyses: see Table 1.

EXAMPLE 5

Procedure as in Comparative example 2. Only 2.72 kg of the silicone-containing polyvinyl alcohol from Example d) were used in place of W25/140. Furthermore, 14 bar of ethylene were injected.

Dispersion Analyses: see Table 1.

EXAMPLE 6

Procedure as in Comparative example 2. Only 2.71 kg of the silicone-containing polyvinyl alcohol from Example e) were used in place of W25/140. Furthermore, 14 bar of ethylene were injected.

Dispersion Analyses: see Table 1.

EXAMPLE 7

Procedure as in Comparative example 0.2. Only 2.71 kg of the silicone-containing polyvinyl alcohol from Example f) were used in place of W25/140. Furthermore, 14 bar of ethylene were injected.

Dispersion Analyses: see Table 1.

EXAMPLE 8

The dispersion from Example 7 was admixed with 5% by weight (solid/solid) of the silicone-containing polyvinyl alcohol from Example f) and diluted with water to an atomization viscosity of 250 mPas. The dispersion was then sprayed by means of a two-fluid nozzle. Air which had been precompressed to 4 bar served as atomization component, and the droplets formed were dried in cocurrent by means of air heated to 125° C. The dried powder obtained was admixed with 10% by weight of commercial antiblocking agent (mixture of calcium-magnesium carbonate and magnesium hydrosilicate). A white, free-flowing powder was obtained.

As can be seen from Table 1, the silicone-containing polyvinyl alcohols (vinyl alcohol-PDMS copolymer or vinyl acetate-vinyl alcohol-PDMS terpolymer) prepared in the examples are best suited for use in the emulsion polymerization.

This demonstrated by comparison of comparative examples C1 to C4, which were prepared using the commercial polyvinyl alcohols which have previously been found to be useful in emulsion polymerization, with Examples 1 to 7 which were prepared using silicone-containing polyvinyl alcohols.

When these are used, dispersions having an advantageous particle size distribution were obtained and coagulum formation was not observed in any of the examples. The viscosity can be varied over a wide range by means of the molecular weight of the polyvinyl alcohol (cf. Comparative examples C1, C3, C4).

TABLE 1

Dispersion analyses

| Ex. | $T_g$ °C. | pH | BF 20 mPas | D nm | Dn μm | Dv μm | SA m² | SC % |
|---|---|---|---|---|---|---|---|---|
| C1 | 9.6 | 4.83 | 385 | 275 | 0.219 | 0.451 | 20.0 | 58.8 |
| C2 | 9.2 | 5.18 | 3220 | 390 | 0.08 | 0.759 | 16.7 | 58.0 |
| C3 | 10.3 | 5.15 | 8400 | 317 | 0.08 | 0.314 | 26.7 | 59.7 |
| C4 | 9.3 | 5.34 | 585 | 267 | 0.209 | 0.493 | 19.9 | 58.9 |
| 1 | 9.0 | 4.9 | 212.5 | 248 | 0.127 | 0.968 | 23.5 | 59.0 |
| 2 | 8.6 | 5.23 | 180 | 256 | 0.219 | 0.452 | 21.1 | 60.2 |
| 3 | 12.2 | 4.3 | 4040 | 227 | 0.111 | 0.175 | 39.2 | 58.1 |
| 4 | 12.4 | 5.5 | 1360 | 289 | 0.275 | 0.312 | 20.0 | 60.9 |
| 5 | 8.0 | 5.4 | 294 | 234 | 0.102 | 1.323 | 25.7 | 59.1 |
| 6 | 8.7 | 5.3 | 274 | 250 | 0.109 | 1.439 | 26.1 | 58.8 |
| 7 | 6.8 | 5.2 | 293 | 229 | 0.137 | 0.180 | 36.4 | 56.9 |

BF 20 = Brookfield viscosity,
D = mean particle size (Nanosizer),
Dn = mean particle size (number average, Coulter Counter),
Dv = mean particle size (volume average, Coulter Counter),
SA = particle surface area per g of polymer dispersion,
SC = solids content.

The dispersions were used to produce paints according to a silicate-rich formulation 1 and a carbonate-rich formulation 2 as per the formulations shown below (Tables 2 and 3):

TABLE 2

Paint formulation 1 (silicate-rich):

| | |
|---|---|
| Water | 350 |
| Cellulose ether (Tylose MH 10000 KG4) | 5 |
| Dispersant (Dispex N 40) | 2 |
| Magnesium silicate (talc N) | 100 |
| Magnesium silicate (Chinaclay Grade B) | 100 |
| Titanium dioxide pigment (Kronos 2300) | 100 |
| Calcium carbonate (Omyacarb 5 GU) | 200 |
| Ammonia | 0.5 |
| Polymer dispersion (SC 60%) | 142.5 |
| Total parts by weight | 1000 |

TABLE 3

Paint formulation 2 (carbonate-rich):

| | |
|---|---|
| Water | 350 |
| Cellulose ether (Tylose MH 10000 KG4) | 5 |
| Dispersant (Dispex N 40) | 2 |
| Titanium dioxide pigment (Kronos 2300) | 100 |
| Calcium carbonate (Omyacarb 5 GU) | 400 |
| Ammonia | 0.5 |
| Polymer dispersion (SC 60%) | 142.5 |
| Total parts by weight | 1000 |

Use Tests:

Testing of the Hydrophobicity by Means of the Water Drop Test

A paint produced according to the above formulations 1 and 2 was applied to Eterplan (commercial fibrocement sheet) (layer thickness: about 400 μm). After drying, 1 ml of water was placed in the form of a drop on the coating by means of a syringe after one day. The time (in minutes) until the drop had spread and thus disappeared was recorded. The longer this time, the higher the hydrophobicity and the water resistance of the paint or the dispersion present therein. In the case of a very hydrophobic dispersion, the drop remains for a number of hours.

Table 4 shows the use data.

TABLE 4

| Example | Hydrophobicity Formulation 2 after 1 day in min | Hydrophobicity Formulation 1 after 1 day in min |
|---|---|---|
| C1 | 60 | 55 |
| C2 | 180 | 190 |
| C3 | 90 | 80 |
| C4 | 60 | 50 |
| 1 | 250 | 270 |
| 2 | 280 | 320 |
| 3 | 255 | 320 |
| 4 | 250 | 270 |
| 5 | 270 | 320 |
| 6 | 280 | 350 |
| 7 | 360 | 410 |

The following can be seen from Table 4:

Comparison of Comparative examples C1, C3 and C4 (commerial polyvinyl alcohols) with Examples 1 to 4 (silicone-containing polyvinyl alcohols from Examples d) and e)) shows that the hydrophobicity can be increased significantly by means of the silicone-containing polyvinyl alcohols. The increase is by a factor of from 3 to 6. In the case of Comparative example C2, a silicone macromer was additionally polymerized into the polymer. This generally leads to an increase in the hydrophobicity. However, comparison with Examples 5, 6 and 7 (likewise with copolymerized silicone macromer) shows that in such systems, too, the hydrophobicity can be additionally increased noticeably by a use of a silicone-containing polyvinyl alcohol.

Comparison of Example 4 (emulsifier: Genapol PF 80) with Example 1 (emulsifier: Genapol X150) (in each case silicone-containing polyvinyl alcohol from Example d)=PVAL with 17.8% by weight of silicone) and comparison of Example 3 (emulsifier: Genapol PF 80) with Example 2 (emulsifier: Genapol X150) (in each case silicone-containing polyvinyl alcohol from Example e); PVAL with 26.0% by weight of silicone) shows that exchange of emulsifiers, in this case Genapol X150 versus Genapol PF80, has no appreciable influence on the hydrophobicity.

Comparison of Example 1 (PVAL with 17.8% by weight of silicone; from Example d)) with Example 2 (PVAL with 26.0% by weight of silicone; from Example e)) and of Example 4 (PVAL with 17.8% by weight of silicone; from Example d)) with Example 3 (PVAL with 26.0% by weight of silicone; from Example e)) shows that the hydrophobicity increases with an increased silicone content in the silicone-containing PVAL used for preparing the dispersion. This is also demonstrated very clearly by, in particular, the series Example 5 (PVAL with 17.8% by weight of silicone; from Example d)), Example 6 (PVAL with 26.0% by weight of silicone; from Example e)) and Example 7 (PVAL with 31.3% by weight of silicone; from Example f)).

Starting up from a dispersion prepared using the silicone-containing polyvinyl alcohols, the addition of a copolymerizable silicone macromer leads to a slight increase in the hydrophobicity. This is demonstrated by comparison of Example 1 (PVAL with 17.8% by weight of silicone; without silicone macromer) and of Example 4 (PVAL with 17.8% by weight of silicone, without silicone macromer) with Example 5 (PVAL with 17.8% by weight of silicone; with silicone macromer in the dispersion). It is also demonstrated by comparison of Example 2 (PVAL with 26.0% by weight of silicone; without silicone macromer) and of Example 3 (PVAL with 26.0% by weight of silicone, without silicone macromer) with Example 6 (PVAL with 26.0% by weight of silicone; with silicone macromer in the dispersion). However, the main influence on the increase in the hydrophobicity comes from the use of silicone-containing polyvinyl alcohols; the additional use of silicone macromers brings only a relatively slight improvement in the hydrophobicity.

The invention claimed is:

1. A process for preparing silicone-modified polymers in the form of an aqueous polymer dispersion or polymer powder prepared therefrom, by means of free-radical polymerization of ethylenically unsaturated monomers in an aqueous medium, comprising polymerizing a polymerizable mixture containing at least one monomer selected from the group consisting of vinyl esters of unbranched or branched $C_{1-15}$ alkylcarboxylic acids, methacrylic esters and acrylic esters of $C_{1-15}$ alcohols, vinyl aromatics, monoolefins, dienes and vinyl halides, to form an addition polymer, and optionally, further auxiliary monomers to form a dispersed phase, and wherein at least one silicone-containing vinyl alcohol copolymer prepared from monomers comprising a) from 0 to 60% by weight of units of one or more vinyl esters of unbranched or branched $C_{1-15}$ alkylcarboxylic acids, b) from 20 to 99.5% by weight of vinyl alcohol units, c) from 0.5 to 70% by weight of units of one or more silicones having the general formula $R^1_a R_{3-a} SiO(SiR_2O)_n SiR_{3-a}R^1_a$, where the radicals R are identical or different and are each a monovalent, substituted or unsubstituted alkyl or alkoxy radical each having from 1 to 18 carbon atoms, $R^1$ is a polymerizable group, a is 0 or 1, and n is from 10 to 1000, where at least one silicone contains at least one radical $R^1$ the percentages by weight add up to 100% by weight, is present during polymerization, is present during polymerization and added following polymerization, or is added following polymerization and the resulting mixture is spray dried to form a polymer powder.

2. The process of claim 1, wherein said silicone-containing polyvinylalcohol copolymer is present prior to commencement of polymerization, or not prior to commencement of polymerization but present during polymerization.

3. The process of claim 1, wherein said silicone-containing polyvinylalcohol copolymer is added after polymerization and prior to spray drying to form a polymer powder.

4. The process of claim 1, wherein the silicone-containing vinyl alcohol copolymer contains vinyl acetate units.

5. The process of claim 1, wherein the silicone-containing vinyl alcohol copolymer contains silicone units c) derived from silicones in which $R^1$ is an alkenyl radical having from 2 to 8 carbon atoms.

6. The process of claim 5, wherein the silicone-containing vinyl alcohol copolymer comprises silicone units c) derived from at least one silicone selected from the group consisting of α-monovinylpolydimethylsiloxanes, α-mono(3-acryloxypropyl)polydimethylsiloxanes, α-mono(acryloxymethyl)polydimethylsiloxanes, α-mono(3-methacryloxypropyl)polydimethylsiloxanes, α,ω-divinylpolydimethylsiloxanes, α,ω-di(3-acryloxypropyl)polydimethylsiloxanes, and α,ω-di(3-methacryloxypropyl)polydimethylsiloxanes.

7. The process of claim 1, wherein vinyl acetate; mixtures comprising vinyl acetate and ethylene, mixtures comprising vinyl acetate and further vinyl esters and optionally ethylene; mixtures comprising vinyl acetate, ethylene, and vinyl chloride; vinyl ester mixtures containing acrylic esters; (meth)acrylic ester mixtures; or mixtures comprising styrene and butadiene or (meth) acrylic esters, are polymerized as ethylenically unsaturated monomers.

8. The process of claim 7, wherein mixtures comprising vinyl acetate and ethylene, or mixtures comprising vinyl acetate, ethylene, and vinyl esters of an α-branched carboxylic acid having 9 or 10 carbon atoms, are polymerized.

9. The process of claim 1, wherein one or more silanes selected from the group consisting of γ-acryloxypropyltri(alkoxy)silanes, γ-methacryloxy-propyltri(alkoxy)silanes, α-methacryloxymethyltri(alkoxy)silanes, γ-methacryloxypropylmethyldi(alkoxy)silanes, vinylalkyldi(alkoxy)silanes and vinyltri(alkoxy)silanes are additionally copolymerized with the ethylenically unsaturated monomers.

10. The process of claim 1, wherein one or more epoxyfunctional monomers selected from the group consisting of glycidyl acrylate, glycidyl methacrylate, allyl glycidyl ether, and vinyl glycidyl ether are additionally copolymerized with the ethylenically unsaturated monomers.

11. The process of claim 1, wherein one or more silicone macromers which have at least one unsaturated group and are selected from the group consisting of linear polydialkylsiloxanes and branched polydialkylsiloxanes having $C_1$-$Chd_6$-alkyl radicals and a chain length of from 10 to 1000, $SiO(C_nH_{2n+1})_2$ units and which contain one or two terminal or pendant polymerizable groups are additionally copolymerized with the ethylenically unsaturated monomers.

* * * * *

UNITED STATES PATENT AND TRADEMARK OFFICE
CERTIFICATE OF CORRECTION

| | |
|---|---|
| PATENT NO. | : 7,381,761 B2 |
| APPLICATION NO. | : 10/542790 |
| DATED | : June 3, 2008 |
| INVENTOR(S) | : Kurt Stark et al. |

Page 1 of 1

It is certified that error appears in the above-identified patent and that said Letters Patent is hereby corrected as shown below:

Column 22, Line 11, Claim 11:

Delete "$C_1$-$Chd_6$-alkyl" and insert -- $C_1$-$C_6$-alkyl --.

Signed and Sealed this

Fourteenth Day of April, 2009

JOHN DOLL
*Acting Director of the United States Patent and Trademark Office*